United States Patent
Park et al.

(10) Patent No.: US 6,411,347 B1
(45) Date of Patent: Jun. 25, 2002

(54) STORAGE CAPACITOR IN A LIQUID CRYSTAL DISPLAY AND A METHOD OF MANUFACTURING THEREOF

(75) Inventors: Sung-Il Park, Kyongsangbuk-do; Tae-Woon Ko, Seoul; In-Jae Chung, Kyhongsangbuk-do, all of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/465,660

(22) Filed: Dec. 17, 1998

(30) Foreign Application Priority Data

Dec. 19, 1998 (KR) .............................................. 98-56449

(51) Int. Cl.⁷ ............................................ G02F 1/1343
(52) U.S. Cl. .............................. 349/39; 349/38; 349/54
(58) Field of Search .............................. 349/38, 39, 54

(56) References Cited

U.S. PATENT DOCUMENTS 5,162,931 A * 11/1992 Holmberg .................... 359/54
5,831,708 A * 11/1998 Hiraishi et al. .............. 349/143
6,285,418 B1 * 9/2001 Ko et al. ...................... 349/38

FOREIGN PATENT DOCUMENTS

JP 3-240263 10/1991
JP 10-173130 6/1998

* cited by examiner

*Primary Examiner*—Kenneth Parker
*Assistant Examiner*—David Chung
(74) *Attorney, Agent, or Firm*—Birch, Stewart, Kolasch & Birch, LLP

(57) ABSTRACT

A structure and method for increasing the capacitance of a storage capacitor in a liquid crystal display device improves the image quality of an LCD device by reducing flickering and other image defects. The LCD device includes a substrate, a gate line on the substrate, a gate insulating layer covering the gate line, and a storage capacitor electrode on the gate insulating layer wherein the storage capacitor electrode is overlapped with the gate line.

20 Claims, 5 Drawing Sheets

STORAGE CAPACITOR IN A LIQUID CRYSTAL DISPLAY AND A METHOD OF MANUFACTURING THEREOF

BACKGROUND OF THE INVENTION

1. Field of the Invention

The present invention relates to a liquid crystal display (LCD) having a storage capacitor and a method of manufacturing thereof. More specifically, the present invention relates to a structure and method for improving the image quality of an LCD by reducing the fluctuations in the capacitance of a storage capacitor of an LCD.

2. Discussion of the Related the Art

A thin film transistor (TFT) LCD device includes TFTs for use as switching devices, capacitors being defined by liquid crystals disposed between upper and lower plate electrodes, subsidiary capacitors, gate lines, and data lines.

For driving a TFT-LCD, a signal voltage is applied to a gate electrode, the TFT then turns on so that a data signal including image data is transmitted to the liquid crystals through the TFT. The liquid crystals that are within the electrode plates of the capacitors are charged. Ideally, the total electric charge that is stored in the liquid crystals remains constant until the next signal is applied.

However, the liquid crystal voltage varies due to the existence of various sources of capacitance and the voltage varies by an amount $\Delta V$, which is expressed by the following approximate formula: $\Delta V = Cgd*Vg/(Cgd+CLC+Csto)$, where $\Delta V$ is the maximum amount of variation of liquid crystal voltage, Cgd is parasitic capacitance due to the overlap between the gate and drain electrodes, CLC is liquid crystal voltage, Csto is the capacitance of a storage capacitor, and Vg is the voltage of the gate electrode. The existence of $\Delta V$ causes distortion in the liquid crystal voltage and is the primary reason for flicker in images produced on the LCD device. To decrease $\Delta V$, it is preferable to increase the capacitance of the storage capacitor Csto.

FIG. 1 shows an arrangement of an LCD device having a gate storage capacitor. Referring to FIG. 1, a pixel is defined on a substrate (not shown) by the intersection of the gate lines 10L and 11L and the data line 12L. A gate electrode 11G is connected to the gate line 11L, a source electrode 12S is connected to the data line 12L, and a drain electrode 12D is arranged so as to oppose the source electrode 12S. An active layer 15 is overlapped with the above-mentioned three electrodes and constitutes a TFT for use as a switching device. A pixel electrode 17 is connected to the drain electrode 12D and covers the pixel area.

A portion of the (n-1)th gate line 10L and a portion of the nth pixel electrode 17 are overlapped and define a storage capacitor. In general, a gate insulating layer and a passivation layer defines a dielectric layer of the storage capacitor and the gate line and the pixel electrode define the electrodes of the storage capacitor.

But, when a subsidiary electrode is connected to the pixel electrode and disposed on the gate insulating layer as shown in FIG. 2, the gate insulating layer functions as a dielectric layer since the subsidiary electrode and gate line also define electrodes of a storage capacitor. In the above-described case, the capacitance can be increased since it is possible to reduce the thickness of the dielectric layer.

FIG. 2 shows a layout view of a storage capacitor in an LCD device according to a related art. FIG. 3 shows a cross-sectional view of a storage capacitor in an LCD device according to a related art. Referring to FIGS. 2 and 3, a gate line 21L including a gate electrode 21G is provided on a substrate 200, and a gate insulating layer 22 is provided on an exposed surface of the substrate including the gate line 21L. A subsidiary electrode 23, which is preferably made of a metal that is used to form the source/drain electrode, is defined on the gate insulating layer 22. A passivation layer 24 covers the subsidiary electrode 23, and a contact hole (not shown in FIG. 2) is defined on the passivation layer 24 and exposes a portion of the subsidiary electrode 23. A pixel electrode 25 is connected to the subsidiary electrode 23 through the contact hole that is defined on the passivation layer 24.

In the above-described structure, storage capacitance of a storage capacitor is provided by the subsidiary electrode 23, a portion of the gate line 21L that is overlapped with the subsidiary electrode 23, a portion of the pixel electrode 25 which is not overlapped with the subsidiary electrode 23, and a portion of the gate line 21L that is overlapped with the pixel electrode which portion is not overlapped with the subsidiary electrode.

For the sake of explanation, the term "storage capacitor" in this specification is defined as the subsidiary electrode 23 and a portion of the gate line 21L which is overlapped with the subsidiary electrode in the present specification.

The capacitance of a storage capacitor is expressed as 'C A/d', where A is the overlapped area between the subsidiary electrode and the gate line, which are two electrodes of the storage capacitor, and d is the thickness of the gate insulating layer, which defines the dielectric layer between the electrodes. Unfortunately, it is difficult to increase the area of the subsidiary electrode due to the structural limitations of the LCD of the related art. Thus, in the related art, it is very difficult to increase the capacitance of the storage capacitor. Accordingly, the conventional LCD device has very poor image quality due to flickering and other image defects.

SUMMARY OF THE INVENTION

To overcome the problems described above, preferred embodiments of the present invention provide a storage capacitor in an LCD device that improves the image quality by increasing the capacitance of the storage capacitor to reduce the fluctuations in the liquid crystal voltage.

Further, preferred embodiments of the present invention provide a storage capacitor in an LCD device that improves the image quality by increasing the capacitance of the storage capacitor by increasing the total exposed surface of the gate line. The total exposed surface of the gate line can be increased by increasing the total number of lateral surfaces in the gate line. The total number of lateral surfaces of the gate line can be increased by one or more open portions in the gate line.

Further, preferred embodiments of the present invention provide a storage capacitor in an LCD device that improves the image quality by increasing the capacitance of the storage capacitor by increasing the area of overlap between the gate line and subsidiary electrode.

A preferred embodiment of the present invention includes a substrate, a gate line on the substrate and including at least one open portion on a surface of the gate line, the open portion defining additional lateral surfaces of the gate line, a gate insulating layer covering the gate line, and a storage capacitor electrode on the gate insulating layer wherein the storage capacitor electrode is overlapped with the gate line.

In another preferred embodiment of the present invention, a method of manufacturing an LCD device includes the steps of providing a substrate, forming a gate line having at least one of open portion on a surface of the gate line, forming a gate insulating layer covering the gate line, and forming a storage capacitor electrode on the gate insulating layer to be overlapped with the gate line.

Therefore, preferred embodiments of the present invention improve the image quality of an LCD display device by reducing flickering and other image defects that are caused by fluctuations in the liquid crystal voltage by increasing the capacitance of a storage capacitor of the LCD display device.

Other elements, features, details and advantages of the present invention will become apparent from the detailed description of preferred embodiments of the present invention in conjunction with the attached drawings.

BRIEF DESCRIPTION OF THE ATTACHED DRAWINGS

The present invention will become more fully understood from the detailed description given herein below and the accompanying drawings which are given by way of illustration only, a and thus do not limit the present invention and wherein.

DETAILED DESCRIPTION OF PREFERRED EMBODIMENTS

Figure 1:
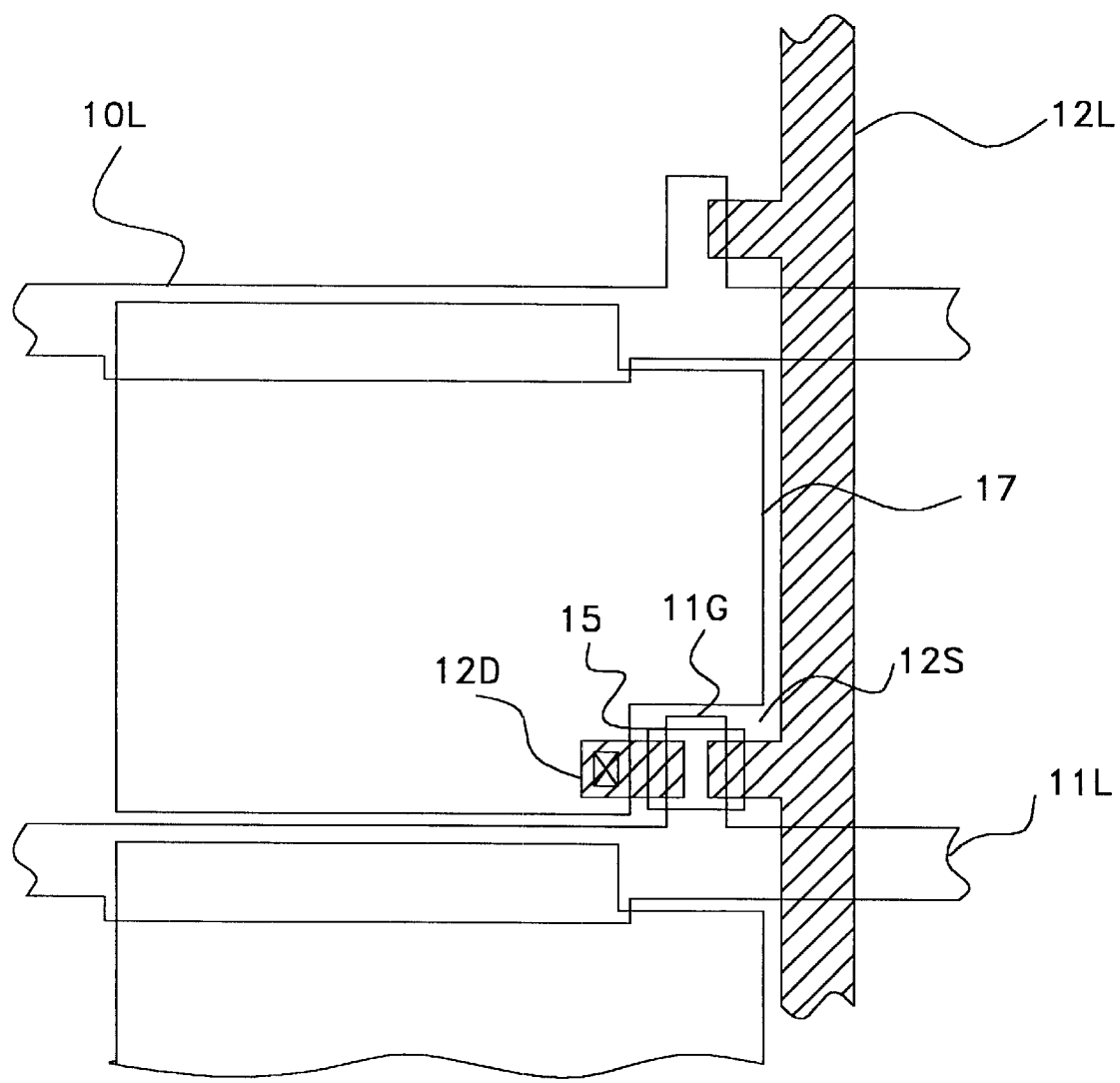
FIG. 1 shows a layout of an LCD device according to a related art.
Figure 2:
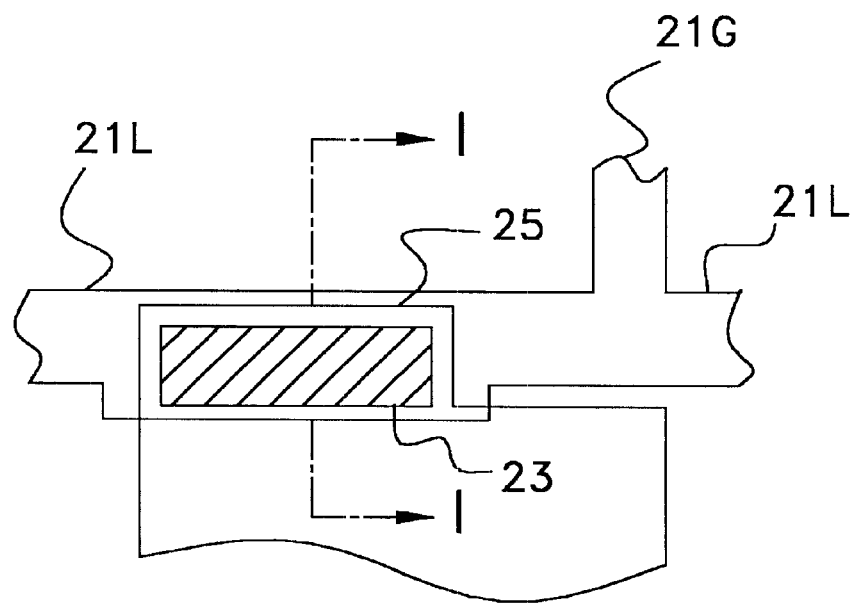
FIG. 2 shows a layout of a storage capacitor in an LCD device according to a related art.
Figure 3:
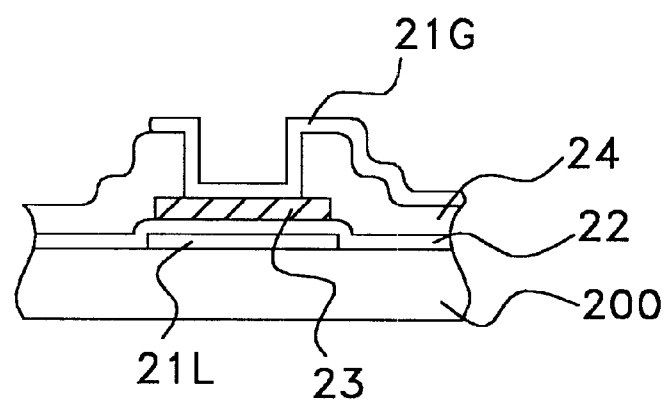
FIG. 3 shows a cross-sectional view bisected along the line I—I of FIG. 2.
Figure 4:
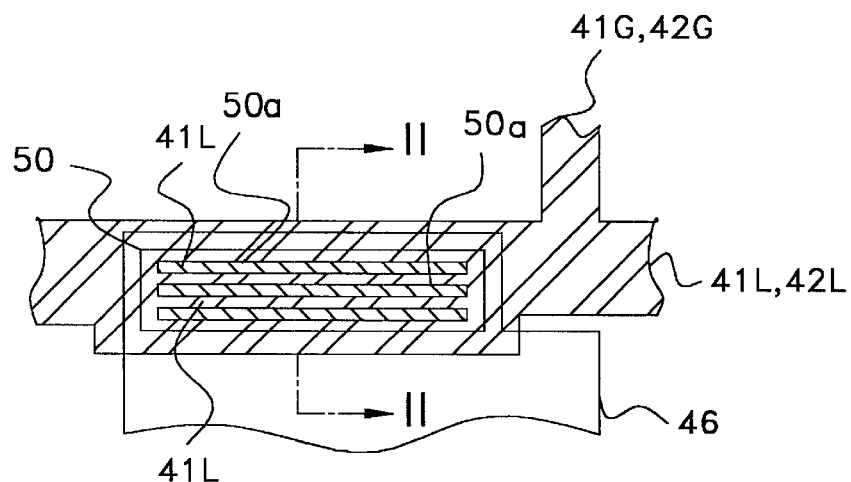
FIG. 4 is a layout of a storage capacitor in an LCD device according to a preferred embodiment of the present invention.
Figure 5:
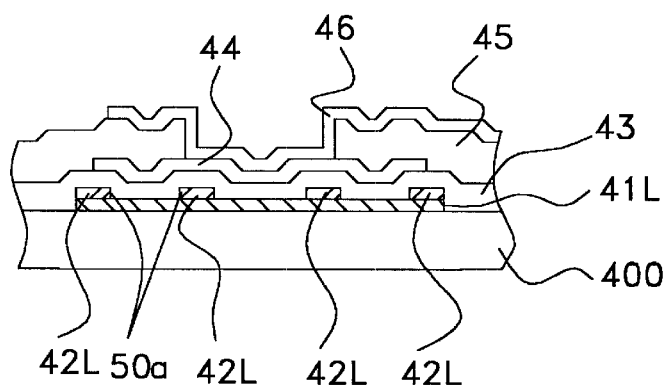
FIG. 5 is a cross-sectional view bisected along the line II—II of FIG. 4.

FIG. 4 is a layout of a storage capacitor in an LCD device according to a preferred embodiment of the present invention, and FIG. 5 is a cross-sectional view bisected along the cutting line II—II of FIG. 4. Referring to FIG. 4 and FIG. 5, a lower gate line 41L is provided on a substrate 400, and an upper gate line 42L is provided on the lower gate line 41L. The upper gate line 42L preferably has the same pattern as the lower gate line 41L but has at least one opened portion 50 that partially exposes a portion of the lower gate line 41L.

The above-described structure improves the 3-dimensional structure of the gate line so that the total exposed surface area of the gate line is increased. Note that in the gate lines 41L and 42L in the present preferred embodiment of the present invention, compared to that of the related art, the total exposed surface is increased by the sum of the lateral surfaces 50a of the opened portions 50. Thus, if the number of opened portions 50 is increased, the number of lateral surfaces 50a is increased. The upper gate line pattern 42L is constructed to have at least one opened portion 50 in at least one preferred embodiment of the present invention, but other preferred embodiments of the present invention may have differing amounts of opened portions 50.

A gate insulating layer 43 is disposed on the exposed surface of the substrate including the upper gate line 42L and the exposed portions of the lower gate line 41L through the opened portions 50. A subsidiary electrode 44, which is preferably made of a metal that is used for the source/drain electrode, is provided on the gate insulating layer 43 such that an electrically-conductive substance is now selectively overlapped with the gate lines 41L and 42L. A passivation layer 45 covers an exposed surface of the substrate including the subsidiary electrode 44 and a contact hole (not shown in FIG. 4) is provided in the passivation layer and exposes a portion of the subsidiary electrode 44 that is on the passivation layer 45. A pixel electrode 46 is connected to the subsidiary electrode 44 through the contact hole that is defined on the passivation layer 45.

A storage capacitor is provided in the present preferred embodiment of the present invention such that the subsidiary electrode 44 functions as a first electrode, and portions of the upper and lower gate lines 42L and 41 L that are overlapped with the subsidiary electrode 44 function as a second electrode of the storage capacitor. The gate insulating layer 43 disposed between the first and second electrodes act as the dielectric layer of the storage capacitor.

In the above-described structure of the present preferred embodiment, the exposed area of the gate line is increased by improving the three dimensional shape of the gate line in the storage capacitor region. Compared to the related art structure, the present invention increases the capacitance of the storage capacitor by increasing the area of overlap between the gate line and subsidiary electrode.

Figure 6A:
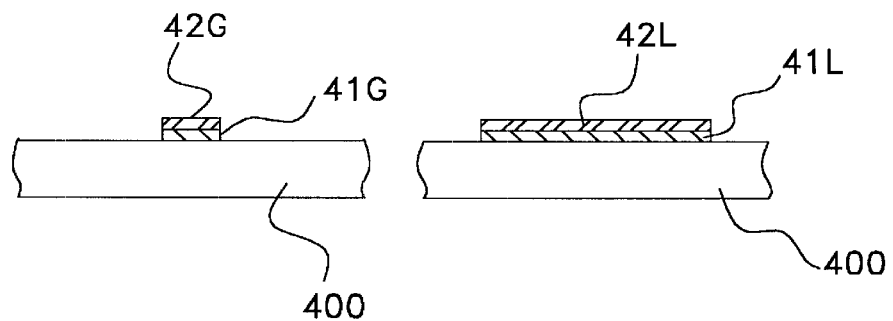
FIG. 6A to FIG. 6E illustrate a method of manufacturing a storage capacitor in a liquid crystal display device according to a preferred embodiment of the present invention.

FIG. 6A to FIG. 6E illustrate a method of manufacturing the storage capacitor in a liquid crystal display according to a preferred embodiment of the present invention. The left sides of FIGS. 6A to 6E show portions of a TFT in an LCD device, while the right sides of FIGS. 6A to 6E show portions of a storage capacitor that is manufactured by the same process used in manufacturing the TFT. Referring to FIG. 6A, first and second conductive layers are deposited sequentially on a substrate. An upper gate line 42L including an upper gate electrode 42G is defined by etching the second conductive layer via a photolithography process. Then, a lower gate line 41L including a lower gate electrode 41G is defined by etching the first conductive layer by using the second conductive layer as an etching mask.

The first conductive layer is preferably about 1000 Å to about 2000 Å thick, and is made of a substance with low resistance, while the second conductive layer is preferably about 1000 Å to about 2000 Å thick and is made of more general conductive substance such as Mo, Cr and other similar substances.

Figure 6B:
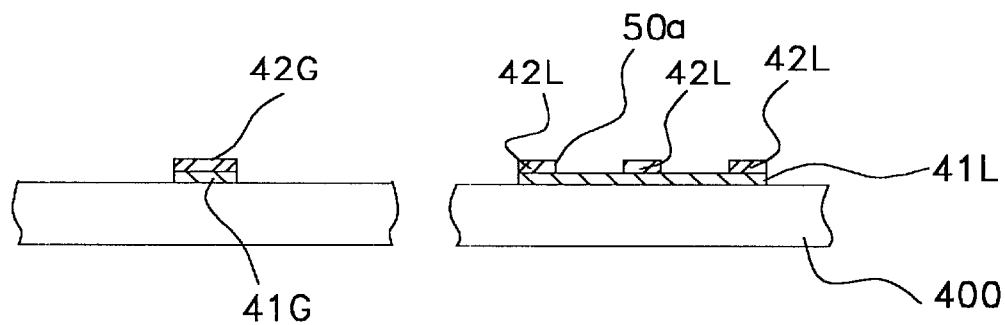

Referring to FIG. 6B, portions of the lower gate line 41L are exposed by etching selected portions of the upper gate line 42L in accordance with a predetermined pattern. During this step, the lateral sides 50a of the upper gate line 41L are preferably exposed, thereby increasing the total exposed area of the gate line by the amount of the lateral sides 50a.

Figure 6C:
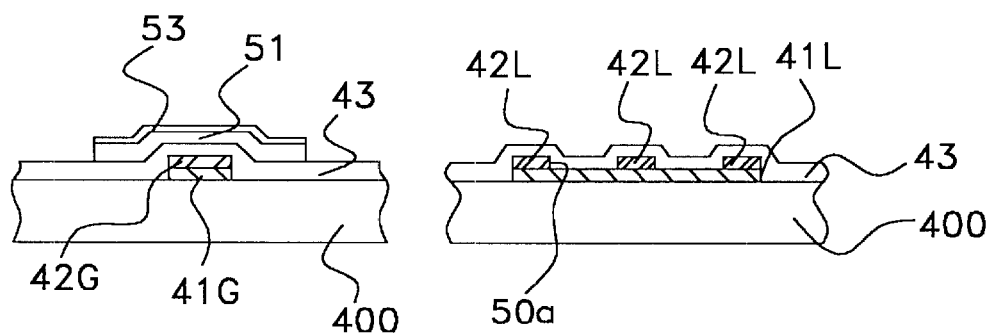

Referring to FIG. 6C, a gate insulating layer 43 preferably having a thickness of about 3000 Å to about 4000 Å is deposited on the exposed surface of the substrate. The gate insulating layer 43 is preferably disposed by depositing silicon oxide or silicon nitride via a conventional deposition method. An active layer 51 and an ohmic contact layer 53 are formed on the TFT portion by depositing a first semiconductor layer having a thickness of preferably about 500 Å to about 1500 Å and a second semiconductor layer, which is doped with impurities and preferably under about 1000 Å thick on the substrate. The first and second semiconductor layers are then patterned preferably via a photolithography process.

Figure 6D:
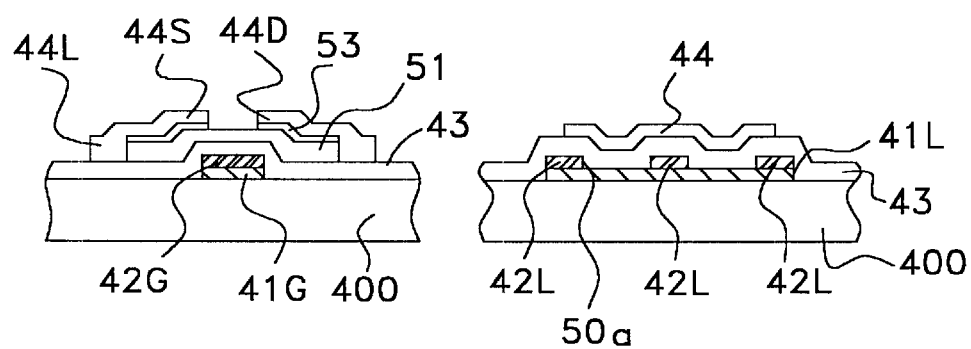

Referring to FIG. 6D, a third conductive layer is deposited on the substrate. A data line 44L including a source electrode 44S and a drain electrode 44D on the TFT portion and a subsidiary electrode 44 on the storage capacitor portion are provided by etching the third conductive layer preferably via a photolithography process. The third conductive layer is preferably about 1500 Å to about 2500 Å thick, and is made of conventional conductive substances such as Mo, Cr and other similar substances. After defining the subsidiary electrode 44, a storage capacitor which includes the gate lines 41L and 42L, the gate insulating layer 43, and the subsidiary electrode 44 is provided. Specifically, the storage capacitor of the present preferred embodiment of the present invention uses the subsidiary electrode 44 as the first electrode, portions of the upper and lower gate lines 42L and 41L that are overlapped with the subsidiary electrode 44 as the second electrode, and the gate insulating layer 43 disposed between the first and second electrodes as the dielectric layer of the storage capacitor. Next, an exposed portion of the ohmic contact layer is removed by using the source and drain electrodes 44S and 44D as an etching mask.

Figure 6E:
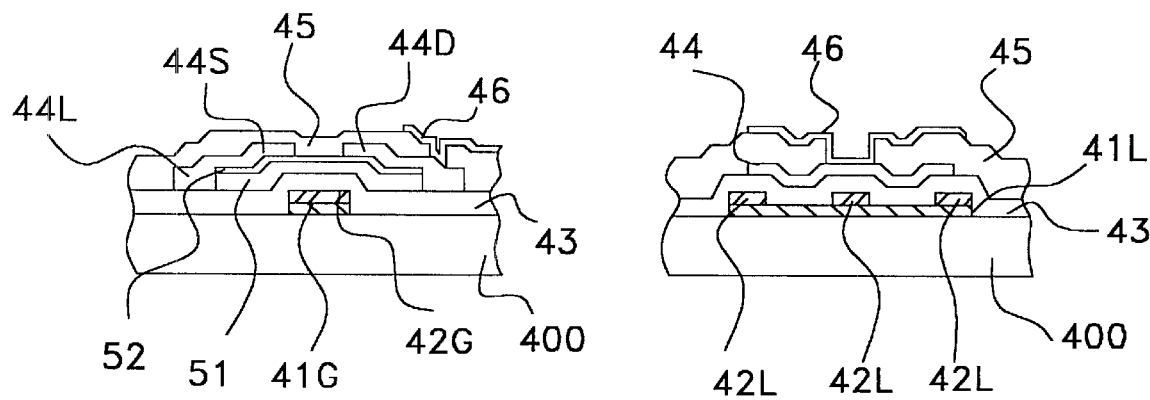

Referring to FIG. 6E, after a passivation layer 45 has been deposited over the substrate, contact holes exposing portions of the drain and subsidiary electrodes 44D and 44 are defined, respectively, by etching the passivation layer 45 preferably via a photolithography process. The passivation layer 45 is preferably provided by deposited silicon oxide or silicon nitride or by stacking silicon oxide and silicon nitride on top of each other. A transparent conductive layer preferably about 500 Å to about 1500 Å thick is deposited over the substrate. Then, a pixel electrode connected to both drain 44D and subsidiary electrodes 44 are provided by etching the transparent conductive layer preferably via a photolithography process. In the present preferred embodiment of the present invention, the overlapped area between the gate line and subsidiary electrode are increased by forming the gate line having a double layer.

As mentioned previously, the method of preferred embodiments of the present invention increases the exposed area of the gate line by improving the three dimensional shape of the gate line that is in the storage capacitor region. Therefore, the present invention increases the capacitance of the storage capacitor by increasing the overlapped area between the gate line and subsidiary electrode.

Figure 7:
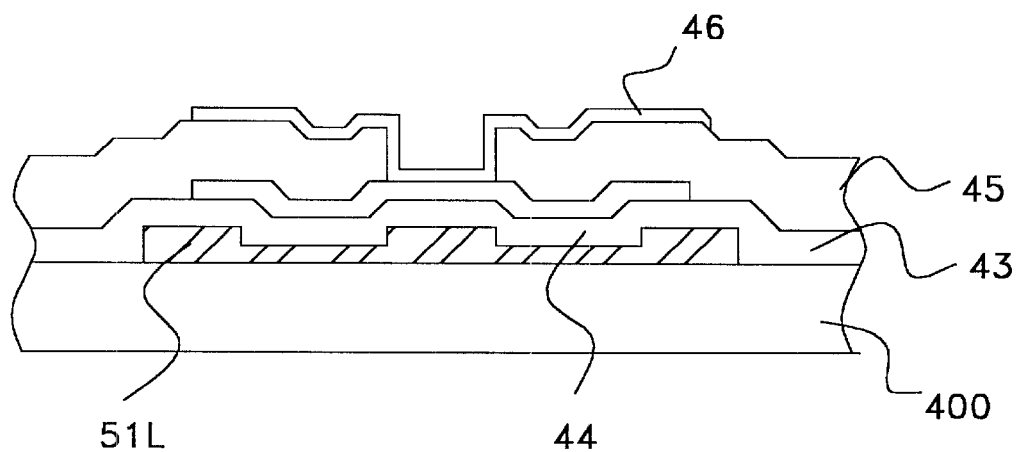
FIG. 7 shows a cross-sectional view of a liquid crystal display according to another preferred embodiment of the present invention.

Referring to FIG. 7, in another preferred embodiment of the present invention, the capacitance is increased by shaping the exposed area of a gate line 51L such that the surface has varying thickness. In this case, the gate line 51L is provided by depositing a conductive layer using a conventional method, then patterning the conductive layer via a photolithography process, then by etching again to selectively remove portions of the gate line 51L but being careful not to expose the substrate 400 and so that the gate line 51L has varying thickness.

Accordingly, the present preferred embodiment of the present invention increases the exposed area of the gate line by improving the spatial configuration of the gate line that is used as an electrode of a storage capacitor, thereby increasing the overlapped area between the gate line and the subsidiary electrode. As a result, the image quality of a LCD is greatly improved by eliminating flickering and other image defects.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display comprising:
    a substrate;
    a gate line on the substrate and including at least one open portion on a surface of the gate line;
    a gate insulating layer covering the gate line; and
    a storage capacitor electrode on the gate insulating layer wherein the storage capacitor electrode is overlapped with the gate line.

2. The liquid crystal display according to claim 1, wherein the gate line further comprising:
    a first gate line on the substrate; and
    a second gate line on the first gate line wherein the at least one open portion is provided on a surface of the second gate line.

3. The liquid crystal display according to claim 1, wherein the gate line is made of a conductive substance.

4. The liquid crystal display according to claim 2, wherein the first gate line is made of a low-resistance conductive substance having a thickness of about 1000 Å to about 2000 Å.

5. The liquid crystal display according to claim 2, wherein the second gate line is made of one of Mo and Cr, and has a thickness of about 1000 Å to about 2000 Å.

6. The liquid crystal display according to claim 1, wherein the gate insulating layer is a dielectric layer.

7. The liquid crystal display according to claim 1, wherein the storage capacitor further comprises:
    a passivation layer covering an exposed surface of the substrate including the storage capacitor electrode;
    a contact hole exposing the storage capacitor electrode in the passivation layer; and
    a pixel electrode connected to the exposed storage capacitor electrode.

8. The liquid crystal display according to claim 2, wherein the second gate line has substantially the same pattern as the first gate line and the at least one open portion has the at least one open portion which exposes a portion of the first gate line.

9. The liquid crystal display according to claim 1, wherein the gate line is an electrode of the storage capacitor.

10. The liquid crystal display according to claim 1, wherein the gate line includes a plurality of the open portions therein.

11. The liquid crystal display according to claim 1, wherein the plurality of open portions define a plurality of lateral surfaces of the gate line to increase the total exposed surface of the gate line.

12. The liquid crystal display according to claim 1, wherein the at least one open portion increases the number of lateral surfaces of the gate line to increase the total exposed surface of the gate line.

13. A method of manufacturing a liquid crystal display comprising the steps of:
    providing a substrate;
    forming a gate line having at least one open portion on a surface of the gate line for forming additional lateral surfaces of the gate line;
    forming a gate insulating layer covering the gate line; and forming a storage capacitor electrode on the gate insulating layer to be overlapped with the gate line.

14. The method of claim 13, wherein the step of forming the gate line further comprises:
   forming a stacked gate line including a first and second gate line; and
   etching selectively the second gate line for forming the at least one open portion a surface of the second gate line.

15. The method of claim 14, wherein the step of forming the gate line further comprises:
   forming the second gate line to have substantially the same border pattern as the first gate line; and
   and exposing a portion of the first gate line by etching the second gate line.

16. The method of claim 13, the method further comprising the steps of:
   forming a passivation layer over the substrate including the storage capacitor electrode;
   forming a contact hole that exposes a portion of the storage capacitor electrode in the passivation layer; and
   forming a pixel electrode connected to the exposed storage capacitor electrode.

17. The method of claim 13, wherein forming the storage capacitor electrode includes forming the storage capacitor with an electrically-conductive substance that is used for a source/drain region in a pixel portion of the liquid crystal display.

18. The method of claim 10, wherein the step of forming a gate line further comprises:
   depositing a conductive layer on the substrate;
   patterning the conductive layer to form a gate line; and
   removing selected portions of the patterned conductive layer via an etching process, wherein removing the selected portions include shaping the conductive layer to have varying thickness such that all portions of the substrate that is beneath the conductive layer remain covered.

19. The method of claim 18, wherein the step of removing selected portions includes forming at least one of lateral surfaces on a surface of the conductive layer.

20. The method of claim 13, further comprising the step of forming a plurality of the open portions in the surface of the gate line to define a plurality of additional lateral surfaces of the gate line to increase the total exposed surface of the gate line.

* * * * *